(12) United States Patent
Tzschoppe

(10) Patent No.: US 8,159,492 B2
(45) Date of Patent: Apr. 17, 2012

(54) METHOD FOR SIMULATING OPTICAL COMPONENTS FOR THE STEREOSCOPIC PRODUCTION OF SPATIAL IMPRESSIONS

(75) Inventor: Wolfgang Tzschoppe, Rothenstein (DE)

(73) Assignee: Phoenix 3D, Inc., Merrick, NY (US)

( * ) Notice: Subject to any disclaimer, the term of this patent is extended or adjusted under 35 U.S.C. 154(b) by 1913 days.

(21) Appl. No.: 10/526,645

(22) PCT Filed: Sep. 2, 2003

(86) PCT No.: PCT/EP03/09724
§ 371 (c)(1),
(2), (4) Date: Mar. 3, 2005

(87) PCT Pub. No.: WO2004/023348
PCT Pub. Date: Mar. 18, 2004

(65) Prior Publication Data
US 2005/0233788 A1    Oct. 20, 2005

(30) Foreign Application Priority Data
Sep. 3, 2002 (DE) .................................. 102 41 475

(51) Int. Cl.
*G06T 15/10*    (2011.01)
(52) U.S. Cl. ................... 345/427; 345/419; 345/420
(58) Field of Classification Search .................. None
See application file for complete search history.

(56) References Cited

U.S. PATENT DOCUMENTS
6,064,424 A * 5/2000 van Berkel et al. ............. 348/51
(Continued)

FOREIGN PATENT DOCUMENTS
CA        02436596    *   8/2001
(Continued)

OTHER PUBLICATIONS

Dumbreck, A.A. and Smith, C.W., "3-D TV displays for industrial applications," IEE Colloquium on Stereoscopic Television, Oct. 15, 1992, pp. 7/1-7/4.

*Primary Examiner* — Said Broome
(74) *Attorney, Agent, or Firm* — 24IP Law Group; Timothy R. DeWitt

(57) ABSTRACT

The invention relates to a simulation method, especially to a method for simulating spatial impressions which are produced by means of an image generator and one or several filter arrays.

The method according to the invention essentially comprises the following steps:

a) Specification of the geometry of the image generator, b) specification of the geometry of the filter array, c) specification of a spatial arrangement geometry in relation to the image generator and the filter array in a three-dimensional coordinate system (X,Y,Z), d) specification of two monocular positions of observation in front of the said arrangement geometry, e) specification of a combined image containing bits of partial information from several views $A_k$ (k=1 . . . n) of a scene, f) determination of a first and a second secondary image containing image elements of the specified combined image which are visible to the eye of an observer in the specified first and second monocular position of observation on the basis of the specified filter array geometry in conjunction with the specified image generator geometry and the spatial arrangement geometry, and g) stereoscopic visualization of the first and second secondary images as a left and right stereoscopic image, respectively.

1 Claim, 13 Drawing Sheets

U.S. PATENT DOCUMENTS

| | | | |
|---|---|---|---|
| 6,683,725 B2 * | 1/2004 | Wohlstadter | 359/626 |
| 6,944,328 B2 * | 9/2005 | Yoshida | 382/154 |
| 7,404,645 B2 * | 7/2008 | Margulis | 353/31 |
| 2003/0067539 A1 | 4/2003 | Doerfel et al. | |
| 2004/0245440 A1 | 12/2004 | Klippstein et al. | |

FOREIGN PATENT DOCUMENTS

| | | |
|---|---|---|
| DE | 100 03 326 A1 | 8/2001 |
| DE | 201 21 318 U1 | 7/2002 |
| JP | 2002245451 | 8/2002 |
| WO | WO 03/024122 A1 | 3/2003 |

* cited by examiner

|  | j=1 R | j=2 G | j=3 B | j=4 R | j=5 G | j=6 B | j=7 R | j=8 G | j=9 B | j=10 R | j=11 G | j=12 B | j=13 R | j=14 G | j=15 B | j=16 R | j=17 G | j=18 B | j=19 R | j=20 G | j=21 B |
|---|---|---|---|---|---|---|---|---|---|---|---|---|---|---|---|---|---|---|---|---|---|
| i=1 | 2 | 3 | 4 | 5 | 6 | 7 | 8 | 1 | 2 | 3 | 4 | 5 | 6 | 7 | 8 | 1 | 2 | 3 | 4 | 5 | 6 |
| i=2 | 3 | 4 | 5 | 6 | 7 | 8 | 1 | 2 | 3 | 4 | 5 | 6 | 7 | 8 | 1 | 2 | 3 | 4 | 5 | 6 | 7 |
| i=3 | 4 | 5 | 6 | 7 | 8 | 1 | 2 | 3 | 4 | 5 | 6 | 7 | 8 | 1 | 2 | 3 | 4 | 5 | 6 | 7 | 8 |
| i=4 | 4 | 5 | 6 | 7 | 8 | 1 | 2 | 3 | 4 | 5 | 6 | 7 | 8 | 1 | 2 | 3 | 4 | 5 | 6 | 7 | 8 |
| i=5 | 5 | 6 | 7 | 8 | 1 | 2 | 3 | 4 | 5 | 6 | 7 | 8 | 1 | 2 | 3 | 4 | 5 | 6 | 7 | 8 | 1 |
| i=6 | 6 | 7 | 8 | 1 | 2 | 3 | 4 | 5 | 6 | 7 | 8 | 1 | 2 | 3 | 4 | 5 | 6 | 7 | 8 | 1 | 2 |
| i=7 | 6 | 7 | 8 | 1 | 2 | 3 | 4 | 5 | 6 | 7 | 8 | 1 | 2 | 3 | 4 | 5 | 6 | 7 | 8 | 1 | 2 |
| i=8 | 7 | 8 | 1 | 2 | 3 | 4 | 5 | 6 | 7 | 8 | 1 | 2 | 3 | 4 | 5 | 6 | 7 | 8 | 1 | 2 | 3 |
| i=9 | 8 | 1 | 2 | 3 | 4 | 5 | 6 | 7 | 8 | 1 | 2 | 3 | 4 | 5 | 6 | 7 | 8 | 1 | 2 | 3 | 4 |
| i=10 | 8 | 1 | 2 | 3 | 4 | 5 | 6 | 7 | 8 | 1 | 2 | 3 | 4 | 5 | 6 | 7 | 8 | 1 | 2 | 3 | 4 |
| i=11 | 1 | 2 | 3 | 4 | 5 | 6 | 7 | 8 | 1 | 2 | 3 | 4 | 5 | 6 | 7 | 8 | 1 | 2 | 3 | 4 | 5 |
| i=12 | 2 | 3 | 4 | 5 | 6 | 7 | 8 | 1 | 2 | 3 | 4 | 5 | 6 | 7 | 8 | 1 | 2 | 3 | 4 | 5 | 6 |
| i=13 | 2 | 3 | 4 | 5 | 6 | 7 | 8 | 1 | 2 | 3 | 4 | 5 | 6 | 7 | 8 | 1 | 2 | 3 | 4 | 5 | 6 |
| i=14 | 3 | 4 | 5 | 6 | 7 | 8 | 1 | 2 | 3 | 4 | 5 | 6 | 7 | 8 | 1 | 2 | 3 | 4 | 5 | 6 | 7 |
| i=15 | 4 | 5 | 6 | 7 | 8 | 1 | 2 | 3 | 4 | 5 | 6 | 7 | 8 | 1 | 2 | 3 | 4 | 5 | 6 | 7 | 8 |
| i=16 | 4 | 5 | 6 | 7 | 8 | 1 | 2 | 3 | 4 | 5 | 6 | 7 | 8 | 1 | 2 | 3 | 4 | 5 | 6 | 7 | 8 |

Fig. 7

METHOD FOR SIMULATING OPTICAL COMPONENTS FOR THE STEREOSCOPIC PRODUCTION OF SPATIAL IMPRESSIONS

FIELD OF THE INVENTION

The invention relates to a simulation method, especially to a method for simulating spatial impressions which are produced by means of an image generator and one or several filter arrays.

BACKGROUND OF THE INVENTION

U.S. Pat. No. 5,311,356 describes the simulation of the effects of optical lenses. For that purpose, sceneries are imaged on films by means of certain lenses. These films are offered to an observer's view for comparison. The film that gives the best visual impression indicates the lens to be selected. The method described in this publication, though, makes it possible only to record real scenes and to assess the resulting films in order to select a particular lens. The simulation of a 3D impression for filter arrays cannot be achieved by the teaching of the publication cited.

Through WO 93/10475, a 3D arrangement using left and right stereo images is known, in which 3D objects/scenes are simulated by producing left and right partial stereo images. The teaching of this publication, however, is not suitable either for simulating 3D impressions of arrangements with filter arrays.

DE 100 03 326 C2 of the present applicant describes a method and arrangements for producing a spatial impression, in which the observers do not require any aids for 3D perception. In this method, a wavelength filter array in front of (possibly also behind) an image generator, so that light propagation directions are specified for the light of the image elements of the image generator depending on their wavelengths. In conjunction with the visualization of a combined image composed of several views of a scene or object on the image elements of the image generator, it is thus achieved that observers at many positions of observation see predominantly a first selection of the views with one eye and predominantly a second selection of the views with the other eye. This produces a spatial impression.

While very good spatial impressions can be achieved with that method, the design of new filter arrays in combination with changing the respective image combination rules is a laborious and expensive affair. So far, every new filter structure desired for trying its effect has to be fabricated as a material object, which makes filter design expensive.

SUMMARY OF THE INVENTION

Proceeding from the prior art described, it is the purpose of the present invention to identify a method by which the spatial impressions to be produced by means of an image generator and a filter array can be simulated. The simulation method should be implementable by the simples and most cost-effective means. Further, it is the purpose of the invention to describe an arrangement for implementing the method.

According to the invention, the problem is solved by a method for the simulation of spatial visual impressions, comprising the following steps:
a) Specification of the geometry of an image generator, especially with regard to the structure and size of its image elements,
b) specification of the geometry of a filter array, especially with regard to the structure and size of its filter elements,
c) specification of a spatial arrangement geometry with regard to the image generator and the filter array in a three-dimensional coordinate system (X,Y,Z),
d) specification of a first and a second monocular position of observation in front of the said arrangement geometry in the three-dimensional coordinate system (X,Y,Z),
e) specification of a combined image that is suitable for being presented on the specified image generator geometry and that, in a defined assignment to the image elements, contains image information from different given primary images that are identical to different views $A_k$ (k=1 ... n) of a virtual or real scene or a virtual or real object,
f) determination of a first and a second secondary image containing image elements of the combined image which are visible to the eye of an observer in the respective first and second monocular positions of observation on the basis of the filter array geometry in conjunction with the image generator geometry and the spatial arrangement geometry, in which an image element of a secondary image may explicitly just as well represent only part of an image element of the combined image, and
g) stereoscopic visualization of the first and second secondary images or parts of these secondary images as a left and right stereoscopic image, respectively.

Steps a) through e) may possibly be performed in a different order or even in parallel.

It is of advantage if the views $A_k$ (k=1 ... n) from which the combined image mentioned in step e) obtains its image information, are views (so-called "primary images") of a spatial test scene.

The term "view" in this connection and hereinafter means a view that corresponds to a two-dimensional image or exposure of a scene or object, e.g., the test scene, recorded from a certain recording position. A view $A_k$ may, for example, correspond to a perspective view or a parallel projection of the test scene. Contrary to this, a combined image simultaneously contains image information from several, i.e. at least two, views.

The said test scene contains preferably two to five, and even more preferably three different graphic objects. In case of three graphic objects in the test scene, these are arranged within the spatial test scene in different depth positions z, and on comparison of different views $A_k$, preferably exactly one of the objects shows no horizontal displacement, exactly one shows a positive, and exactly one a negative horizontal displacement. When presented on an autostereoscopic display, therefore, one of the objects would appear to the observer to lie in front of the image generator surface, one right on it, and one behind it.

For the simulation method described here, it is intended that the objects imaged in the views $A_k$ (k=1 ... n) have a width of at least one full pixel column and a height of preferably at least 24 pixel rows. The objects of the test scene may be homogeneously black, homogeneously gray, or structured. Further, the objects of the test scene may be arranged before a white or structured background.

Advantageously, the views $A_k$ of the test scene are recorded by virtual or real cameras, the optical axes of the virtual or real cameras being aligned in parallel or converging, and the camera positions of any two neighboring views $A_k$ preferably always have approximately the same distance. This feature can easily be implemented: Virtual cameras, which may be constituted, say, by a software-controlled PC, are arranged at equal distances on a circular arc, so that they converge in a certain point, called the fixed point. By contrast, the equidistant arrangement of virtual cameras on a straight line permits their being aligned in parallel.

Otherwise it is also possible that the views $A_k$ for k>1 are generated proceeding from view $A_1$, in such a way that view $A_1$ is generated by means of a parallel projection of the test scene, and that the graphic objects of the test scene imaged in view $A_1$ are individually displaced horizontally to generate the views $A_k$, with k>, the size of the respective displacement being proportional to the depth position of the respective object in the spatial test scene and preferably varied for different views, i.e. with different values of k. The last-named variation of the size of displacement for disjoint values of k means, in particular, that the displacement of an object at any fixed depth position is the greater, as a rule, the higher (or lower) the value of k is.

As a rule, but not necessarily, the image generator geometry to be specified in step a) of the method according to the invention would be an orthogonal array of image elements in rows j and columns i, in which the image elements emit or transmit light of a specified wavelength or of a specified wavelength range, and in which each image element has an outline that can be described by a closed curve and that is preferably polygonal and even more preferably rectangular.

Feasible for special cases are image elements having outlines that are not a closed curve but, for example, several closed curves. This is the case, for example, if an image element is shaped as a ring around a core that does not belong to the image element. Moreover, sometimes two different outlines may be considered to belong to one image element.

The said wavelength ranges may often be those of the primary colors red, green and blue. It is also feasible, though, that the primary color stimulus specifications of the image generator are entirely different.

Orthogonal arrays of image elements in rows j and columns i are relevant, e.g., for commercially available TFT-LC displays or plasma displays.

Depending on the accuracy demands placed on the invented simulation method, specification of the image generator geometry makes allowance for finer details. For example, a smallest image element of a TFT color LC display, i.e. an R, G or B color subpixel, can be specified to have a rectangular or polygonal outline that makes allowance for the form of the transistor covering part of the image element. Where appropriate, allowance may also be made for a "black matrix" surrounding an image element.

Moreover, depending on the demands placed on the simulation, the image generator geometry may include further details, such as the spectral characteristics of the light emitted by the image elements into the space, or the color temperature.

In case of a 15" TFT-LC display, the image generator geometry would be described, e.g., by an orthogonal array of image elements in 768 rows and 3072 columns, in which the first column emits or transmits essentially red light, the second column emits or transmits essentially green light, the third column emits or transmits essentially blue light, the fourth column again emits or transmits essentially red light, etc.

For the purpose of simulation with limited expenditure, each image element may, for example, have an essentially rectangular outline with a height of about 300 µm and a width of about 100 µm. Thus, no allowance would be made for the black matrix, the emission characteristics and, where provided, a transistor partially covering the image elements. For detailed simulations, though, these details may just as well enter the image generator geometry and, thus, the course of the process.

Advantageously, step b) of the invention should be designed in such a way as to specify the filter array geometry of a filter array in the form of a mask image, with wavelength filters and/or gray level filters $\beta_{pq}$ as filter elements in an array of rows q and columns p being combined into such a mask, depending on their transmission wavelength or transmission wavelength range or their transmittance $\lambda_b$, respectively, by the following equation:

$$b = p - d_{pq} \cdot q - n_m \cdot IntegerPart\left[\frac{p - d_{pq} \cdot q - 1}{n_m}\right], \text{ in which}$$

p is the index of a wavelength or gray level filter $\beta_{pq}$ in a row of the array, q is the index of a wavelength or gray level filter $\beta_{pq}$ in a column of the array, b is an integer that defines one of the intended transmission wavelengths or transmission wavelength ranges or a transmittance $\lambda_b$, respectively, for a wavelength or gray level filter $\beta_{pq}$ in the position p,q, and that may adopt values between 1 and $b_{max}$, $n_m$ is an integer greater than zero, $d_{pq}$ is a selectable mask coefficient matrix for varying the generation of a mask image, and IntegerPart is a function for generating the largest integer that does not exceed the argument put in square brackets; and in which each wavelength or gray level filter $\beta_{pq}$ has an outline that can be described by a closed curve and that is preferably polygonal or, even more preferably, rectangular, which outline encloses a filter area of a few 10,000 µm² up to several mm².

For simulations true to detail, the filter array geometry also comprises further optical properties such as, for example, the diffusing behavior of the filters, or makes allowance for the real transmittances (if these deviate from the specified values).

For example, each wavelength or gray level filter element is made with a width about one third of that of an image element. The mask image may satisfy, e.g., the parameters $n_m=24$ and $d_{pq}=-1=$const, with $\lambda_1 \ldots \lambda_3$ being transmission wavelength ranges completely transparent to visible light, and $\lambda_4 \ldots \lambda_{24}$ transmission wavelength ranges completely opaque to visible light. Examples of other parameters can be found found in DE 100 033 26 C2 cited hereinbefore, and in the utility model application DE 201 21 318 U1.

Advantageously, the spatial arrangement geometry specified in step c) describes, in relation to the image generator and the filter array in the three-dimensional coordinate system (X,Y,Z), one plane each for the image generator and the filter array, and the spatial positions of the top left and the bottom right corner point of the filter array or the image generator. For practical applications, the respective planes for the image generator and the filter array will be parallel or at least essentially parallel.

For a 15" LCD, the unit of measurement of the said coordinate system is, e.g., the millimeter. For example, the image generator plane may satisfy the parameter z=0 mm, and the filter array plane may satisfy the condition Z∈[−20 . . . +20 mm]. The position of the respective top left corner point of the filter array or of the image generator may satisfy the parameters x=y=0 mm, and the position of the respective bottom right corner point of the filter array or of the image generator may satisfy, e.g., the parameters x=307.2 mm and y=230.4 mm.

In case the planes of the image generator and the filter array are parallel, the parameters yield the distance between these planes, which distance implies, in conjunction with the equation for the said distance ("z"), described in DE 100 03 326 C2 (cited hereinbefore), a selected viewing distance "$d_a$". This provides an example of a viewing distance in front of the filter array, which can be allowed for in a continuation of the invented simulation method, i.e. in step d), the specification of the monocular positions of observation.

The parameter examples mentioned last only serve for illustration; it is obvious that other values also can be specified for the invented simulation method.

For sophisticated simulations, the arrangement geometry may sometimes include such auxiliary components of the arrangement as substrates, for example in the function of carrier substrates of filter arrays, including their optical properties.

The monocular positions of observation in front of the arrangement geometry to be specified in the three-dimensional coordinate system (X,Y,Z) in step d) advantageously satisfy the condition that the absolute values of the coordinate components X, Y and Z are each smaller than three times the image diagonal of the specified image generator geometry, provided that the origin of the coordinate system (X,Y,Z) lies within the image generator or filter array. However, coordinates for the monocular positions of observation that do not satisfy these specifications are likewise possible.

Further it is of advantage to produce the combined image to be specified in step e) according to the following rule:

Partitioning each of the views $A_k$ (k=1 . . . n) into an equal grid of rows j and columns i, Combining the n views $A_k$ in rows and columns to produce a single combined image with image elements $\alpha_{ij}$, the assignment of bits of partial information from the views $A_k$ (k=1 . . . n) to image elements $\alpha_{ij}$ of the positions i,j being defined by the equation $$k = i - c_{ij} \cdot j - n \cdot IntegerPart\left[\frac{i - c_{ij} \cdot j - 1}{n}\right], \text{ in which}$$

i is the index of an image element $\alpha_{ij}$ in a row of the grid, j is the index of an image element $\alpha_{ij}$ in a column of the grid, k is the consecutive number of the image $A_k$ (k=1 . . . n), from which the partial information originates that is to be rendered on a particular image element $\alpha_{ij}$, $c_{ij}$ is a selectable coefficient matrix for combining or mixing on the grid the different bits of partial information originating from the images $A_k$ (k=1 . . . n), and IntegerPart is a function for generating the largest integer that does not exceed the argument put in square brackets.

Such a combination rule for producing combined images from several views has been described in DE 100 03 326 C2.

Alternatively, there is another advantageous possibility for producing the combined image, in which at least one image element is assigned bits of partial image information from at least two views. Such bits of partial image information from at least two views are presented on at least one image element in a quasi-weighted manner. This novel approach has been described in detail in an as yet unpublished application of the present applicant. In this approach, the combined image to be specified in step e) is produced preferably according to the following rule:

Partitioning the views $A_k$ (k=1 . . . n) each into an equal grid of rows j' and columns i', by which a tensor $A_{ki'j'}$ of order three is formed, which contains the bits of image information from views k (k=1 . . . n) in each equal grid (i',j'), Combining the bits of equal information $A_{ki'j'}$ to produce a single combined image with image elements $\alpha_{ij}$ in a grid (i,j), the assignment of bits of partial information from the tensor elements $A_{ki'j'}$ (k=1 . . . n) to image elements $\alpha_{ij}$ in the positions i,j of the grid (i,j) being defined by the equation $$\alpha_{ij} = \sum_k \sum_{i'} \sum_{j'} A_{ki'j'} \cdot g_{ki'j'ij}, \text{ in which}$$

(g) is a tensor of order five, the elements $g_{ki'j'ij}$ of which are real numbers and have the effect of weighing factors that define the weight of the respective partial information ($A_{ki'j'}$) in an image element $\alpha_{ij}$, and in which the grids (i,j) and (i',j') preferably have the same number of columns and the same number of rows.

With regard to the explanations below it should be noted that there is a functional relationship, due to the respective image generator, between the set value (digital value) for each image element and the measurable luminance produced by corresponding image elements. If, below, the talk is about the modification of a set value, it is, of course, assumed that a modified set value results in a modified measurable luminance on the respective image element.

Favorably eligible as set values are integral values within a range from 0 to 255 for each of the primary colors red, green and blue. Accordingly, the digitized form of a (colored) image, e.g., the combined image, comprises a matrix of values which contains, as entries, an abundance of such set values. If the image generator is of the RGB type, a full-color image element (full-color pixel) is represented, as a rule, by a triplet of such set values, i.e. by one each for red, green and blue. Apart from this, the term "image element" as used within the context of the present invention especially refers to the smallest physical unit of an image generator, namely, e.g., an R, G or B color subpixel.

That said, the determination of each of the secondary images as mentioned in step f) according to the invention is preferably performed as follows:

Copying the combined image (with the image elements $\alpha_{ij}$) to the respective secondary image to be produced, determination, for each individual image element copied in the secondary image, which area share of it is visible to the eye of an observer in the respective position of observation, allowance being made for the specified filter array geometry, the specified image generator geometry, and the spatial arrangement geometry, and modification (a) of the set value of each individual copied image element in the secondary image by multiplication of its original set value by the area quotient "determined visible area share of each individual copied image element in the secondary image, divided by the full area of the respective image element" and/or modification (b) of the set value of each individual copied image element in the secondary image by multiplication of its original or already modified set value by a correction factor $f_k$, preferably $0 \leq f_k \leq 1$, and which is a measure of the wavelength-dependent or wavelength-independent transmittance of all wavelength and/or gray level filters lying between the observer's eye in the respective position and the respective image element, or which is a measure of the wavelength-dependent or wavelength-independent transmittance of all wavelength and/or gray level filters following the respective image element seen from the respective viewing direction.

In other words, each copied image element in the secondary image, which originally was exactly like the specified combined image, is modified, with the understanding that this modification sometimes may result in an unchanged image element or an unchanged set value of an image element. Modification (a) here relates to a modulation of the set value, which results from the fact that, because of the filter array(s) before or/and behind the image generator, some of such image elements are only partly visible, or not visible at all, from the respective monocular position of observation. The set values of the respective image elements would then be modified accordingly.

Modification (b), on the other hand, results from the influence on the visible luminance of the respective image elements by the said transmittances of the relevant wavelength or gray level filters. In this latter connection there may be an influence, for example, by the fact that real parameters are specified for the simulation, which means, e.g., that the light intensity for a red filter is specified to transmit only 50% of the red wavelength range, in order to obtain results that are real to the greatest possible extent (rather than results that occur only theoretically, with absolutely ideal filters).

Thus, the secondary images are determined especially allowing for the wavelength/the wavelength range assigned to the respective image element, and further allowing for all wavelength or gray level filters situated between the observer's eye in the respective position, or for all wavelength or gray level filters following the respective image element seen from the respective viewing direction.

In the modifications (a) and (b) of the set value of each individual copied image element in the secondary image, as described above in detail for step f), another function to be specified should preferably be allowed for. This function to be specified describes, for an image generator, the functional relationship between the measurable luminance of an image element and its set value, i.e. the digital value set, which adopts values from 0 to 255, as a rule.

The said function can be ascertained empirically, for example, by presenting, for the different (e.g., the red, green and blue) wavelength ranges, full-area test images with different set values on the respective image generator and measuring the respective luminance.

For special applications it may be sensible to determine more than only two secondary images for correspondingly more than two monocular positions of observation according to the teaching of the invention.

The determination of each of the secondary images referred to in step f) of the invention may also be performed as follows:

Area scanning of the planar component lying closest to the respective monocular position of observation according to the specified arrangement geometry, i.e. of either a filter array or the image generator, and, concurrently with the area scanning, production of a sufficiently resolved secondary image, which is an essentially correct replica of the respective visible area shares of the image elements of the combined image, or of the wavelength or gray level filters illuminated by these image elements, allowance being made for the specified filter array geometry—especially wavelength-dependent or wavelength-independent transmittances of the wavelength or gray level filter geometry—, the specified image generator geometry, and the spatial arrangement geometry.

Here again, each secondary image is produced making allowance especially for the wavelength/the wavelength range assigned to the respective image element, and for all wavelength or gray level filters lying between the observer's eye in the respective position, or for all wavelength or gray level filters following the respective image element as seen in the respective viewing direction.

The said area scanning is preferably performed by (virtually specified) rows and columns; the number of rows and columns should be several thousand, depending on the required quality of the simulation results.

The production of the essentially correct replica of the respective visible area shares of the image elements of the combined image, or of the wavelength or gray level filters illuminated by the image elements of the combined image, may be effected using known ray tracing algorithms, for example. This may also include the specified filter array geometry—especially wavelength-dependent or wavelength-independent transmittances of the wavelength or gray level filter geometry—, the specified image generator geometry, and the spatial arrangement geometry.

In the determination of the secondary image by means of scanning, as described above in detail for step f), another function to be specified should preferably also be allowed for. This function to be specified describes, for an image generator (for example, one that satisfies the specified image generator geometry requirements), the relationship between the measurable luminance of an image element and its set value.

Step f) of the invention can, of course, also be performed in a different way.

In a further development the method according to the invention, step g) provides for separate display of the secondary images to the left and the right eye, in which the secondary images are presented spatially side by side, spatially nested, or in temporal succession by means of an image generator, for example a cathode ray tube, an LC display, a DMD projector or a plasma display. Particularly preferably, the display of the secondary images is effected by means of an image generator that has the image generator geometry specified in step a), especially with regard to the structure and size of the image elements.

Within the scope of the said separate display of the secondary images to the left and the right eye, an observer is caused to have a virtual 3D impression by means of a stereoscopic visualization method that visually fuses the secondary image pair or magnified sections of it. This may be done, for example, with or without a stereoscope. Both crossed and non-crossed fusion can be used to advantage.

Optionally, it is feasible to provide for a magnified of the combined image or a section of it, in which the color of the image elements (e.g., the R,G,B subpixels) and the number of the respective views $A_k$ (1 ... n) assigned to the respective image element are visibly displayed. In addition to this information, either the associated modified set value or the visible area outline (depending on how step f is configured) can be presented. Further, for special simulations it may be of advantage to present the secondary images in a way that is accurate in respect of the image elements and preferably in respect of area luminance.

Further, the method according to the invention can be developed in such a way that an added step h) is performed after, or in parallel with, step g), this added step comprising the following operation:

Spatially staggered and/or temporally staggered comparison of the stereoscopically visualized first and second secondary images with a stereoscopically visualized image pair from the views $A_k$, in which preferably an image generator with approximately equal parameters each is used for the stereoscopic visualization of the first and second secondary images as well as for the stereoscopic visualization of the image pair from the views $A_k$.

Optionally, this step may stereoscopically visualize only sectional magnifications of the said images.

Further, it is useful to expand the method according to the invention by a step i) performed after, or in parallel with, step g) or h), the added step comprising the following operation:

Variation of the first and/or second position of observation in at least one of their coordinates in the coordinate system (X,Y,Z), and repetition of steps e) through g) or e) through h), and optionally any number of repetitions of the said step i).

By means of this step i) it is possible to obtain information about the image elements visible at diverse monocular positions of observation in front of the simulated arrangement consisting of image generator and filter array(s). If a sufficient number of nodal points (i.e. monocular positions of observation) have been simulated, qualitative information can be obtained about the state of the observation space. A good compromise between the extent (i.e. frequency) of simulation and the frequency of nodal points in the observation space results if the coordinates in X direction or horizontally in front of the image generator are each varied by integral multiples of 65 mm. The value of 65 mm represents the average human interpupillary distance.

Further, the variation of the simulation method can be effected in another advantageous way: If, for example, one or several of the specifications made in steps a), b) and/or c), i.e. image generator geometry, filter array geometry, and/or spatial arrangement geometry, are varied from simulation to simulation (i.e. from one execution of the complete simulation method to another execution of the complete simulation method), different image generator and/or filter array and/or arrangement geometries can be compared with regard to their image elements visible in one or several positions of observation.

Such comparisons are very helpful for the improvement of arrangements for spatial display by means of filter array(s) and image generators. And lastly, further criteria for assessing the secondary images determined can be called in here, such as, for example, the number of image elements visible in a specified monocular position of observation, or its spectral composition.

The problem of the invention is also solved by an arrangement for implementing the invented simulation method, comprising:
a) Means for the digital specification of the image generator geometry of an image generator, especially with regard to the structure and size of the image elements,
b) Means for the digital specification of the filter array geometry of a filter array, especially with regard to the structure and size of the filter elements,
c) Means for the digital specification of a spatial arrangement geometry in relation to the image generator and the filter array in a three-dimensional coordinate system (X,Y,Z),
d) Means for the digital specification of a first and a second monocular position of observation in front of the said arrangement geometry in the said three-dimensional coordinate system (X,Y,Z),
e) Means for the specification of a combined image, which is suitable for display on the specified image generator geometry, and which, in a defined assignment to the image elements, contains bits of image information from different given primary images, which are identical to different views $A_k$ (k=1 ... n) of a virtual or real scene, or of a virtual or real object,
f) Means for the determination of a first and a second secondary image, which contains those image elements of the specified combined image that are visible to an observer's eye in the respective specified first and second monocular position of observation due to the specified filter array geometry in conjunction with the specified image generator geometry and the spatial arrangement geometry, including the explicit option that one image element of a secondary image may represent only a part of an image element of the specified combined image, and
g) Means for the stereoscopic visualization of the first and second secondary images or parts of these secondary images as a left and right stereoscopic image, respectively.

The means a) through f) are preferably designed as a single unit, namely, a software-controlled PC. Means eligible as means g) are preferably a stereoscope or shutter glasses, and a monitor. It is also feasible, however, to utilize purely visual fusion without any aids for stereoscopic visualization. In this way, distortions of the results due to imperfections of the means used for stereoscopic visualization are avoided.

Moreover it is also feasible to specify, in step b), a geometry other than a filter array geometry, that describes other optical properties, for example the geometry of a lenticular screen. Preferably, the geometry thus specified is one for optical components that is already used in prior art in conjunction with spatial display. The steps described below will then have to be adapted, according to their teaching, to the substitution of the filter array by the said other geometry that describes certain optical properties. Thus, even the simulation of the 3D impression produced by 3D goggles, say, anaglyphic goggles, can be effected within the scope of the teaching herein presented.

Moreover, the method according to the invention can be expanded by a temporal component, for example in order to simulate the 3D impression of spatial moving images on a particular arrangement, or to include into the simulation the temporally varying properties of certain temporally sequential 3D display methods, say, of systems using shutter glasses.

BRIEF DESCRIPTION OF THE DRAWINGS

Below, the invention is described in detail with reference to drawings, in which:

FIG. 7 shows an example of a possible structure of a combined image composed of several views.

DETAILED DESCRIPTION OF THE INVENTION

Figure 1:
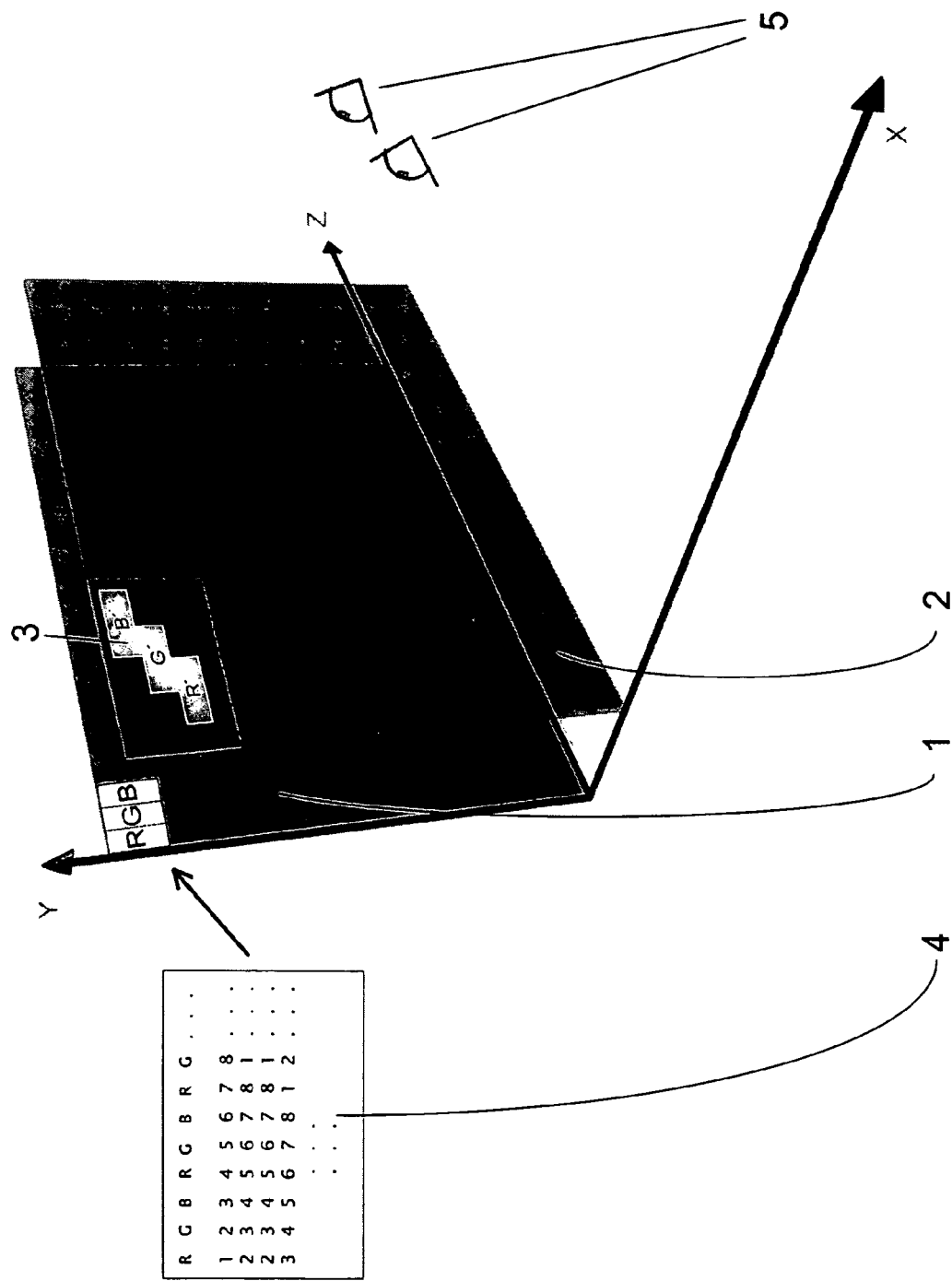
FIG. 1 is a sketch illustrating the principle of possible details in conjunction with the filter array, image generator and arrangement geometries.

FIG. 1 is a sketch illustrating the principle of possible details in conjunction with the filter array, image generator and arrangement geometries. It shows an image generator 1 and a filter array 2 with a great number of wavelength and/or gray level filters 3, of which only a few are visible on the drawing. Also sketched in is an example of a structure 4 of a combined image which is composed of several views $A_k$ and which can be displayed on the image generator 1. The drawing also shows a three-dimensional coordinate system (X,Y,Z). Reference number 5 indicates two examples of monocular positions of observation in the coordinate system (X,Y,Z).

The execution of the invented method for simulating spatial visual impressions, described at the beginning, is now explained in detail with reference to FIG. 1.

As already explained, the steps of the method are as follows:
a) specification of the geometry of an image generator 1, especially with regard to the structure and size of its image elements,
b) specification of the geometry of a filter array 2, especially with regard to the structure and size of its filter elements,
c) specification of a spatial arrangement geometry with regard to the image generator 1 and the filter array 2 in a three-dimensional coordinate system (X,Y,Z),
d) specification of a first and a second monocular position of observation 5 in front of the said arrangement geometry in the three-dimensional coordinate system (X,Y,Z),
e) specification of a combined image that is suitable for being presented on the specified image generator geometry and that, in a defined assignment to the image elements, contains image information from different given primary images that are identical to different views $A_k$ (k=1 ... n) of a virtual or real scene or a virtual or real object,
f) determination of a first and a second secondary image containing image elements of the combined image which are visible to the eye of an observer in the respective first and second monocular position of observation 5 on the basis of the filter array geometry in conjunction with the image generator geometry and the spatial arrangement geometry, in which an image element of a secondary image may explicitly just as well represent only part of an image element of the combined image, and
g) stereoscopic visualization of the first and second secondary images or parts of these secondary images as a left and right stereoscopic image, respectively.

The specification of the image generator geometry of an image generator 1 in step a) especially comprises the specification of the structure and size of the image elements. As shown in FIG. 1, the specified structure of the image generator could be, for example, one of the RGBRGBRGB . . . type, which is the case for many LCD and plasma screens.

The individual color subpixels R, G, B are e.g., of rectangular shape; let a possibly existing black matrix be neglected at first. The color subpixels R, G, B could be specified, for example, as 300 μm high and 100 μm wide each, with a total number of 3072 columns and 768 rows being provided. This corresponds to a full-color resolution of 1024×768 pixels, i.e. XGA resolution. The dimensions exemplified are typical of a 15" LCD.

Figure 2:
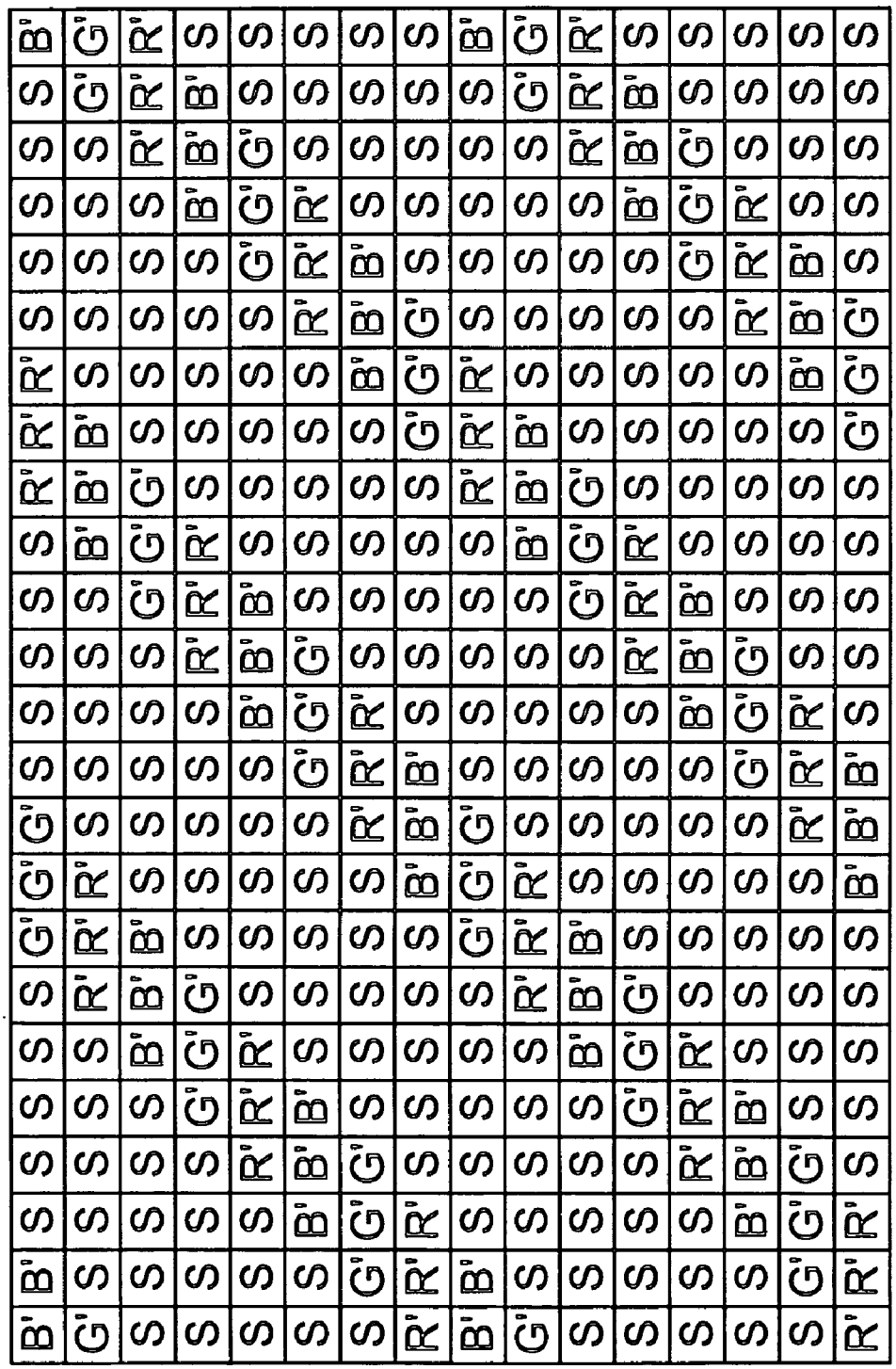
FIG. 2 shows an example of a structure for a wavelength filter array.

In step b), i.e. the specification of the geometry of a filter array 2, especially with regard to the structure and size of the filter elements, the filter array structure a segment of which is shown in FIG. 2 would be specified here, for example. Let every filter element 3 on the array, i.e. each individual wavelength filter or gray level filter, have an essentially rectangular form with a height of 299.3 μm and a width of 99.77 μm. On the drawing, filter elements transparent to the red wavelength range 3 are marked R', green ones G' and blue ones B'. A black area on filter array 2 in FIG. 1, or a filter element 3 marked "S" in FIG. 2 corresponds to one or several filter elements 3 that are opaque to light.

Let there be provided on filter array 2 as many rows and columns as are needed to cover an area with filter elements 3 that is at least equal in size to the image-producing surface of image generator 1. By the way, FIG. 1 indicates only a segment of the filter elements 3 on filter array 2.

The specification of a spatial arrangement geometry in step c) in relation to image generator 1 and filter array 2 in a three-dimensional coordinate system (X,Y,Z) especially comprises information on the (relative) arrangement of image generator 1 and filter array 2. Advantageously, the specified spatial arrangement geometry in relation to image generator 1 and filter array 2 in the three-dimensional coordinate system (X,Y,Z) describes one plane each for image generator 1 and filter array 2, and the spatial position of the top left and bottom right corner points of filter array 2 or image generator 1. For practical applications, the respective planes for image generator 1 and filter array 2 should be parallel or at least essentially parallel.

For a 15" LCD, the unit of measurement of the said coordinate system is, e.g., the millimeter. The image generator plane satisfies, for example, the parameter z=0 mm, while the filter array plane satisfies the condition z∈[−20 . . . +20 mm], or strictly speaking, according to FIG. 1, Z∈[0 . . . 20 mm], since filter array 2 is, in the viewing direction, in front of image generator 1. The position of the top left corner point of filter array 2 or image generator 1 satisfies the parameters x=y=0 mm, and the position of the bottom right corner point of filter array 2 or image generator 1 satisfies the parameters x=307.2 mm y=230.4 mm.

In case of the planes of image generator 1 and filter array 2 being parallel, the parameters yield the distance between the planes, which in conjunction with the equation for the distance z, given in DE 100 03 326 C2 (cited above), implies a selected viewing distance $d_a$. Thus, an example of a viewing distance $d_a$ is given, which may be allowed for in the further execution of the invented simulation method, namely in the specification of the monocular positions of observation 5 according to step d). The last-named parameters (given as examples) only serve for illustration; the values specified for the invented simulation method may, of course, be different ones.

For sophisticated simulations, the arrangement geometry may sometimes also comprise such auxiliary components of the arrangement as substrates, used, e.g., as carrier substrates of filter arrays, including their optical properties.

Again with reference to FIG. 1, the specification of a first and a second monocular position of observation 5 in front of the said arrangement geometry in the three-dimensional coordinate system (X,Y,Z), made in step d), practically explains itself. There exist then, for example, two sets of coordinates $(X_1, Y_1, Z_1)$ or $(X_2, Y_2, Z_2)$, which clearly define the two monocular positions of observation 5. The positions of observation 5 in FIG. 1 are indicated schematically by two eyes. The coordinates of the positions of observation may be, for example, ($X_1$=150 mm, $Y_1$=115 mm, $Z_1$=700 mm), or ($X_2$=215 mm, $Y_2$=115 mm, $Z_2$=700 mm).

With regard to step e), which comprises the specification of a combined image that is suitable for display on the image generator geometry and which, in a defined assignment to the image elements, contains image information from different given primary images, which are identical to different views $A_k$ (k=1 . . . n) of a virtual or real scene or of a virtual or real object, see the image component 4 in FIG. 1. Here, a possible image combination structure is given schematically as a small segment. The letters R,G,B denote the red, green and blue subpixel columns (image element columns) of an image generator 1; each number from 1 to 8 indicates the number of the view $A_k$ (k=1 . . 8) from which partial image information originates that is to be presented in the respective image position in the combined image. A somewhat larger segment of the same image combination structure is shown in FIG. 7 and will be discussed below in more detail.

Figure 3:
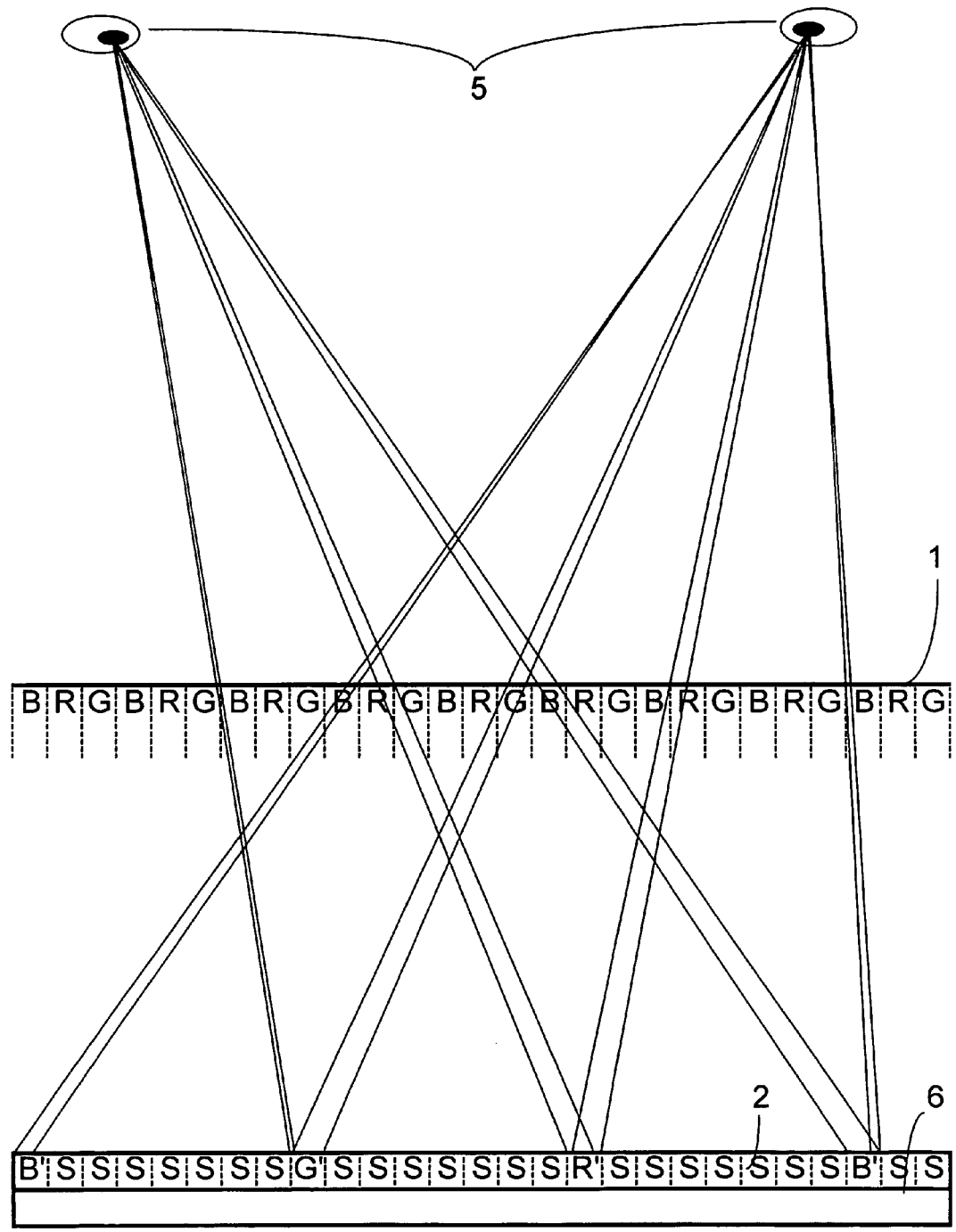
FIG. 3 is a cross-sectional sketch illustrating the principle of the possible mode of operation of a filter array, which here is arranged, for example, behind a translucent or transparent image generator (e.g., an LCD)

Reference is now made to FIG. 3 for a detailed explanation of step f), i.e. the determination of a first and a second secondary image containing image elements of the combined image which are visible to the eye of an observer in the specified first and second monocular positions of observation 5 on the basis of the specified filter array geometry in conjunction with the specified image generator geometry and the spatial arrangement geometry, in which an image element of a secondary image may explicitly just as well represent only part of an image element of the combined image.

Here again, an image generator 1 and a filter array 2 are shown schematically, in addition to which a background illuminator 6 that emits an area of white light is provided. The arrangement according to FIG. 3 differs from that according to FIG. 1 in that the filter array 2 lies behind the image generator 1 (in viewing direction). As a matter of course, this image generator 1 must be transparent, translucent or at least transflective in order that the filter array 2 can be effective. In FIG. 3, again, two monocular positions of observation 5 are indicated schematically.

The determination of each of the secondary images referred to in step f) of the invention is preferably performed as follows:

Copying the combined image (with the image elements $\alpha_{ij}$) to the respective secondary image to be produced, determination, for each individual image element copied in the secondary image, which area share of it is visible to an observer's eye in the respective position of observation 5, allowance being made for the specified filter array geometry, the specified image generator geometry and the spatial arrangement geometry, and modification (a) of the set value of each individual copied image element in the secondary image by multiplication of its original set value by the area quotient "determined visible area share of each individual copied image element in the secondary image, divided by the full area of the respective image element" and/or modification (b) of the set value of each individual copied image element in the secondary image by multiplication of its original or already modified set value by a correction factor $f_k$, preferably $0 \leq f_k \leq 1$, and which is a measure of the wavelength-dependent or wavelength-independent transmittance of all wavelength and/or grey level filter elements 3 lying between the observer's eye in the respective position and the respective image element, or which is a measure of the wavelength-dependent or wavelength-independent transmittance of all wavelength and/or grey level filter elements 3 following the respective image element in the respective viewing direction.

In other words, each copied image element in the secondary image, which originally was exactly like the specified combined image, is modified. Here, the modification relates to a modulation of the set value, which results from the fact that, because of the filter array(s) before or/and behind the image generator, some of such image elements are only partly visible, or not visible at all, from the respective monocular position of observation 5. The set value of the respective image element would then be modified accordingly Modification (b), on the other hand, results from the influence on the visible luminance of the respective image elements by the said transmittances of the relevant wavelength or gray level filters. In this connection it may be relevant, e.g., to specify real parameters for the simulation, which means, e.g., that the light intensity for a red filter is specified to transmit only 50% of the red wavelength range, in order to obtain results that are real to the greatest possible extent (rather than results that occur only theoretically, with absolutely ideal filters).

FIG. 3 is a cross-sectional sketch illustrating the principle of the possible mode of action of a filter array which here, for example, is arranged behind a transparent or translucent image generator (e.g., an LCD). It can be seen that, from either of the two monocular positions of observation 5, only a certain area share is visible of almost every (visible) image element, i.e. color subpixel, of image generator 1. It is exactly on this visible share that the modulation (a) of the set value, described above, is based. The color subpixels are marked R, G and B here.

Of course it is also possible in practice to carry out the above-mentioned copying of the combined image, the determination of the visible area shares, and the modifications (a) and/or (b) of the set values quasi-simultaneously or in a different order which, however, must ensure the desired functionality just as well, or in the order given above but image element by image element.

Figure 11:
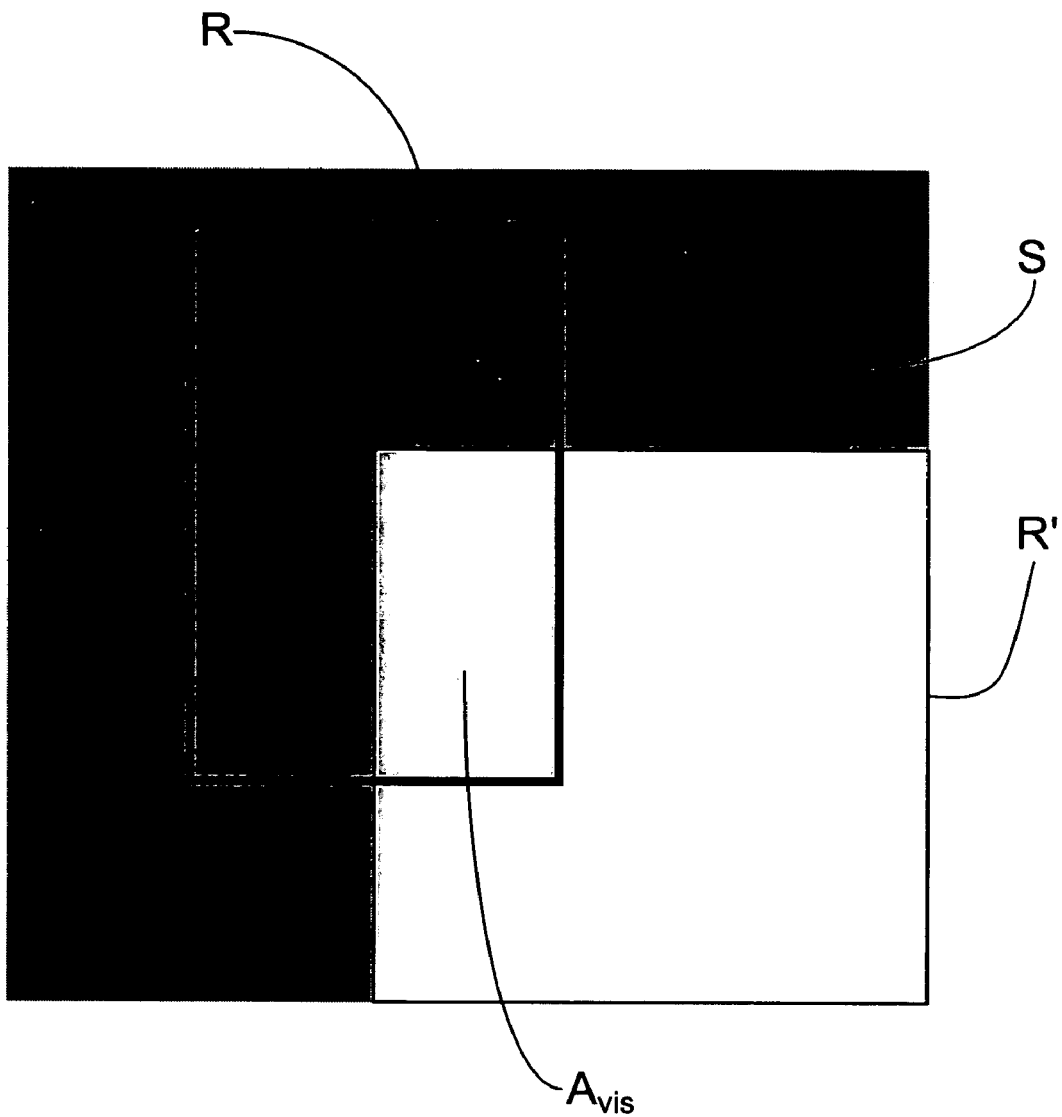
FIG. 11 is a sketch illustrating the principle of determining an area share of a red image element visible through a red wavelength filter.

For the explanation of the matter of visible area shares of an image element, reference is made also to FIG. 11. This shows, schematically and not to scale, a highly enlarged section of a possible viewing condition from a possible monocular position of observation. It illustrates the principle of determining the area share of an image element, that is visible through a red wavelength filter.

(R) denotes a red image element of the combined image that is represented on image generator 1. Also provided are filter elements 3 (wavelength or gray level filters) that are opaque to visible light and which are shown here as a unit (S) (hatched). The hatched unit (S) of filter elements 3 may, for example, be formed also by putting several opaque filter elements 3 closely together.

Also shown is a red wavelength filter (R'), which, as configured in FIG. 1, is arranged in front of the image generator 1 with the image element (R). It can be seen from FIG. 11 that, from the monocular position of observation S on which the configuration is based, only the area share $A_{vis}$ is visible of the image element (R) of the image generator 1, which, as declared, represents a combined image from several views $A_k$.

This area share, which can be determined, e.g., by ray tracing procedures, is used for the above-described modification (a) of the set value in the respective secondary image. Here, the area share $A_{vis}$ corresponds to the "determined visible area share of each individual copied image element in the secondary image", with the "full area of the respective image element" corresponding to the total area of the image element (R) here. The procedure would be applied analogously to each image element of image generator 1, including the green and blue ones, for example.

In the determination of the secondary image as described above in detail for step f), another function to be specified should preferably be allowed for. This function describes, for an image generator 1, e.g. one that satisfies the specified image generator geometry requirements, the functional relationship between the measurable luminance of an image element and its set value, i.e. the respective digital value used to control the respective image element.

The said function can be ascertained empirically, for example, by presenting, for the different (e.g., the red, green and blue) wavelength ranges, full-area test images of corresponding coloration with different set values on the respective image generator 1 and measuring the respective luminance.

Figure 12:
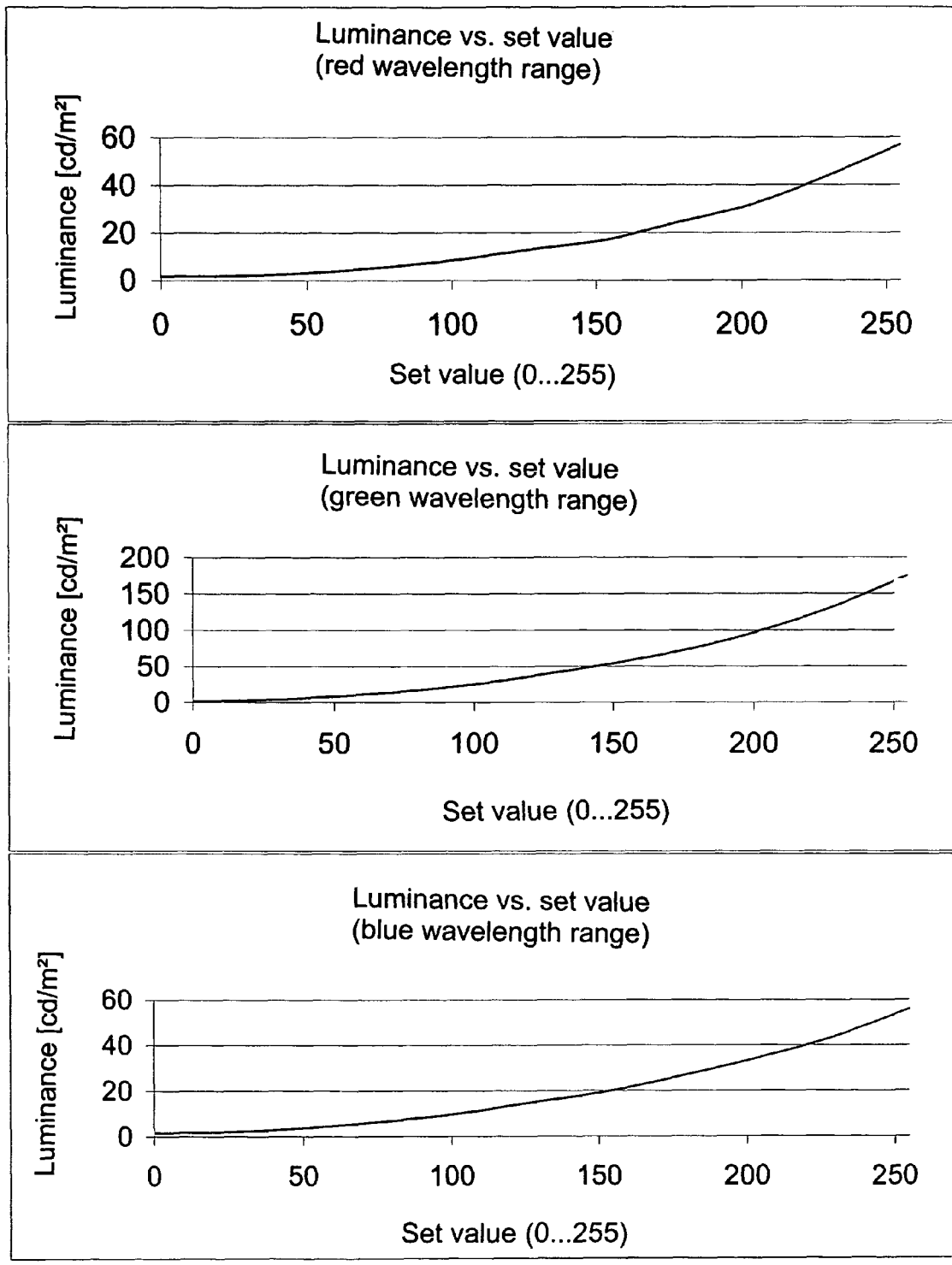
FIG. 12 shows examples of graphs illustrating the functional relationship between the measurable luminance and the digital set values for an LCD used as an example, and FIG. 13 schematically shows an example of a first and a second view, and an example of a possible simulation result based on these views.

Examples of results of this kind are shown on the diagrams in FIG. 12 for an image generator 1 that is a model LG LM151X2-C2TH make. As suggested above, the diagrams were recorded for full-area red, green and blue test images, and they show the above-mentioned functional relationship between set value (each for red, green and blue image elements) and the resulting luminance.

The respective set value is represented by the abscissa. It is common to specify set values for RGB displays in a range of 0 . . . 255 (for R, G and B each). The ordinate represents the measurable luminances recorded for each of the set values.

These diagrams clearly show that there is a non-linear relationship between the set value and the measurable luminance, so that, for example, this visible half of an image element cannot simply be implemented by halving the set value (in modification (a)). It is rather necessary here—as mentioned before—to use an appropriate function to be specified, preferably to be determined or specified separately for every wavelength range involved, in order to achieve a suitable modification (a)—and also (b)—of the set value.

The function is, for example, simply given by the appropriate diagram: If, for example, the visible half of a green image element (which in the combined image is controlled, for example, by the highest set value of 255) is to be represented by its modified set value in the secondary image, the set value would have to be modified to about 185. The set value 185 can easily be read from the middle diagram in FIG. 12 by finding, proceeding from the maximum possible luminance (which corresponds to the set value 255), that set value that corresponds approximately to half the maximum luminance.

The function to be specified thus supplements or replaces the above-named quotient "determined visible area share of each individual copied image element in the secondary image, divided by the full area of the respective image element", in that it extends the modification (a) if the digital set value in such a way that the modification of the luminance (of the respective image element) resulting from the modification of the set value is carried out in the correct proportion to the above area share quotient.

Compared to this, the reason for modification (b) is the influence exerted on the measurable luminance of the respective image elements by the said transmittances of the relevant wavelength or gray level filter elements 3. In this connection, it may be relevant to specify real parameters for the simulation. This means that, e.g., the light intensity for a red filter element 3 is specified to transmit only 50% of the red wavelength range, in order to obtain results that are real to the greatest possible extent (rather than results that occur only theoretically, with absolutely ideal filters). This case is not shown on the drawings. For the last-named modification (b), too, the functional relationship between set value and measurable luminance as described before should be taken into account in that, for example, an appropriate function is specified or determined empirically.

Thus, the determination of the secondary images is performed making allowance especially for the wavelength/the wavelength range assigned to the respective image element, and for all wavelength or gray level filter elements 3 lying between the observer's eye in the respective position and the respective image element, or for all wavelength or gray level filter elements 3 following the respective image element as seen in the respective viewing direction.

No drawings have been attached for illustrating the stereoscopic visualization (step g)) of the first and second secondary images or parts of these secondary images as left and right stereoscopic images, respectively, as various approaches to this are known in prior art.

As mentioned at the beginning, it is of advantage if the views $A_k$ (k=1 . . . n) from which the combined image of step e) obtains its image information are views ("primary images") of a spatial test scene. The term "view", in this connection as well as hereinafter, means a view that corresponds to a two-dimensional image or exposure of a scene or object, for example of the test scene, recorded from a particular recording position. A view $A_k$ may correspond, for example, to a single perspective view or a parallel projection of the test scene. (By contrast, a combined image simultaneously contains image information from several, i.e. at least two, views.)

The said test scene contains preferably two to five, even more preferably three different graphic objects. In case the test scene contains three graphic objects, the objects are arranged within the spatial test scene in different depth positions z, and in a comparison of different views $A_k$, preferably exactly one of the objects shows no displacement, exactly one of them shows a positive, and exactly one of them a negative horizontal displacement. When presented on an autostereoscopic display, then, the observer would see one of the objects in front of the image generator surface, another one on that surface, and the third one behind that surface.

Figure 4:
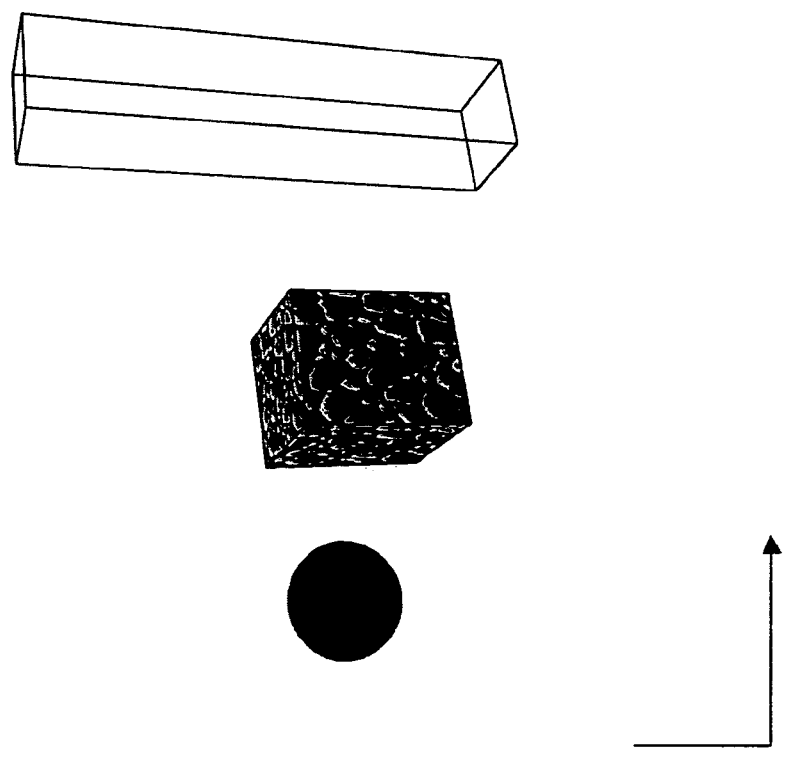
FIG. 4 shows an example of a test scene that can be used to advantage in the method according to the invention.
Figure 4:
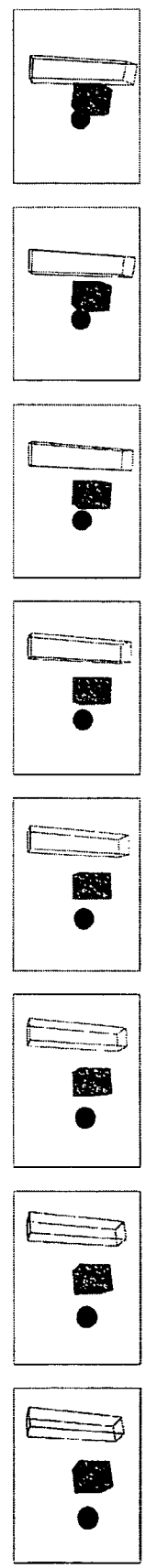

Such a scene is sketched schematically in the upper part of FIG. 4. In this case the sphere would be arranged in a rear depth position, the structured rectangular solid in the middle depth position (corresponding to the image generator surface of an autostereoscopic image generator), and the rectangular solid shown in mere outline in a front depth position. The lower part of FIG. 4 schematically shows eight views $A_k$ ("primary images") recorded of this test scene, for example with a virtual camera, this virtual camera possibly being a software-controlled PC. The views $A_k$ may also be colored, of course. The combined image employed in the invented method is composed of these views $A_k$ (k=1 . . . 8) according to a specified image combination structure (e.g., according to that illustrated in FIG. 7).

Figure 5:
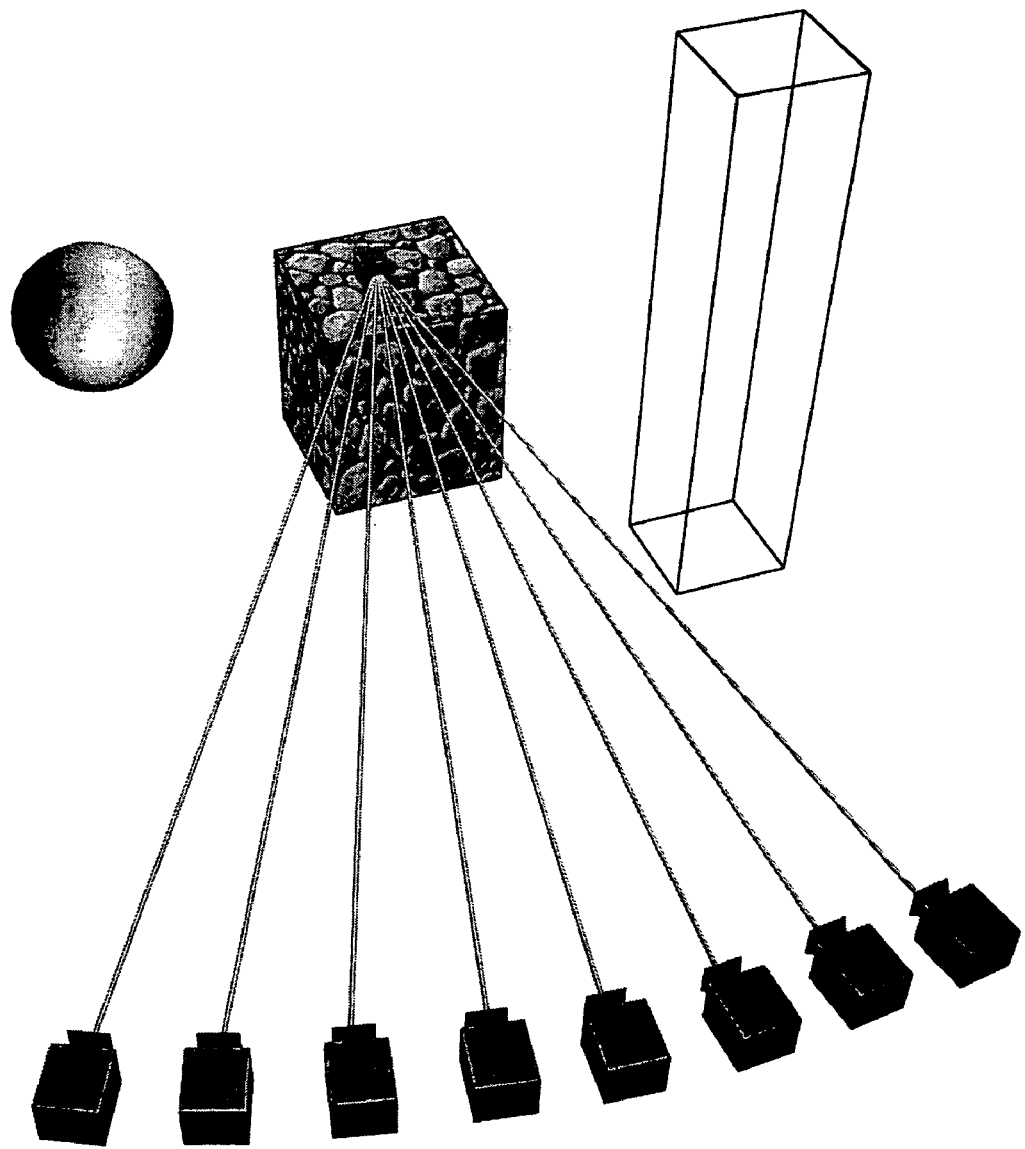
FIG. 5 is a sketch illustrating the principle of an example of the constellation of the virtual or real cameras recording the eight views, and illustrating especially the cameras' convergence.

Advantageously, the views $A_k$ of the test scene are recorded with virtual or real cameras; the axes of these virtual or real cameras are aligned either in parallel or converging, and the respective camera positions of every two neighboring views $A_k$ are preferably spaced at approximately equal distances. This characteristic can be easily implemented: Virtual cameras formed, say, by a software-controlled PC, are arranged at equal distances on a circular arc, so that they converge in a certain point called the fixed point. The principle of this arrangement is shown in FIG. 5. Here, the fixed point lies on the surface of the structured rectangular solid in the middle.

Alternatively, it is also possible that the views $A_k$ with k>1 are generated proceeding from view $A_1$ in such a way that view $A_1$ is formed by means of a parallel projection of the test scene, and that, for generating the views $A_k$ with k>1, each of the graphic objects of the test scene depicted in view $A_1$ is displaced horizontally, so that the measure of the respective displacement is proportional to the depth position of the respective object in the spatial test scene, and the measure of displacement preferably varies for different views, i.e. for different values of k. The said variation of the measure of displacement for disjoint values of k means, especially, that the displacement of an object in any fixed depth position is the greater, as a rule, the higher (or lower) the value k is.

Figure 6:
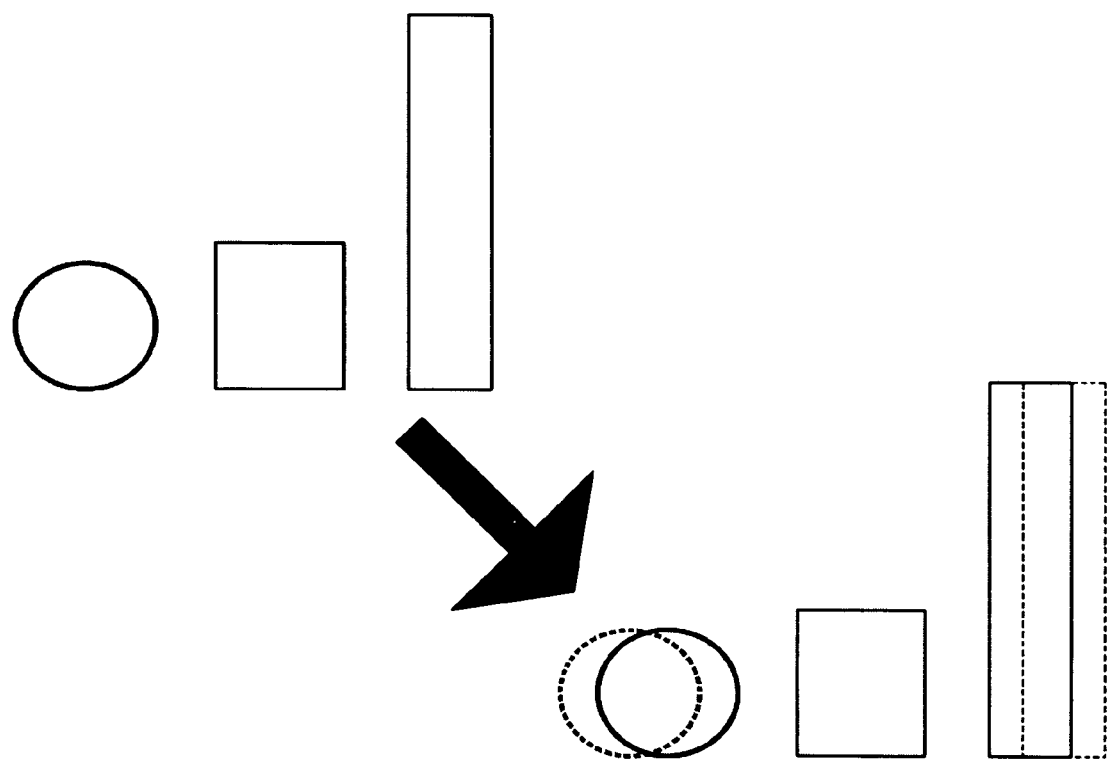
FIG. 6 is a sketch illustrating the principle of generating different views from a first view A, by horizontal displacement of the objects imaged.

This procedure is shown schematically in FIG. 6. The image at top left in FIG. 6 approximately corresponds to a rather simplified parallel projection of the test scene. FIG. 6 is without shadings and hatchings, as these are not required to understand the said procedure. The said top left image now at first corresponds to the parallel-projected view $A_1$. Proceeding from this view $A_1$, the graphic objects contained are displaced horizontally as described above.

The latter procedure is illustrated in the bottom right image part of FIG. 6: The broken lines indicated the outer edges of the objects in the view $A_2$ thus generated. If the view $A_3$—not shown here—were to be generated as well, one would increase the measure of displacement as described before, and the left or right object would, for synthesizing this view $A_3$, be displaced farther than for view $A_2$. The rectangular solid in the middle would not be displaced, as it is in a middle depth position corresponding to the image generator surface of an autostereoscopic image generator.

As mentioned in the beginning, it is of advantage to design step b) of the invention in such a way that the filter array geometry of a filter array 2 is given in the form of a mask image. Therein, wavelength filters and/or gray level filters $\beta_{pq}$ (i.e. the filter elements 3 of the filter array 2) are combined into such a mask image in an array of rows q and columns p depending on their transmission wavelength/their transmission wavelength range/their transmittance $\lambda_b$, according to the following equation:

$$b = p - d_{pq} \cdot q - n_m \cdot IntegerPart\left[\frac{p - d_{pq} \cdot q - 1}{n_m}\right], \text{ in which}$$

p is the index of a wavelength or gray level filter $\beta_{pq}$ in a row of the array,
q is the index of a wavelength or gray level filter $\beta_{pq}$ in a column of the array,
b is an integer specifying one of the intended transmission wavelengths or wavelength ranges or a transmittance $\lambda_b$, respectively, for a wavelength or gray level filter $\beta_{pq}$ in the position p,q and can adopt values between 1 and $b_{max}$,
$n_m$ is an integer greater than zero,
$d_{pq}$ is a selectable mask coefficient matrix for varying the generation of a mask image, and
IntegerPart is a function for generating the largest integer that does not exceed the argument put in square brackets; and
each wavelength or gray level filter $\beta_{pq}$ has an outline that can be described by a closed curve and that is preferably polygonal and even more preferably rectangular, and that has a filter area of a few 10,000 μm² up to several mm².

For example, each wavelength or gray level filter element $\beta_{pq}$ is made about one third as wide as an image element of the image generator 1, i.e., for example, 33.26 μm wide and 299.3 μm high. An example of a mask image can be produced with the following parameters: $\lambda_1 \ldots \lambda_3$ are transmission wavelength ranges completely transparent to visible light, $\lambda_4 \ldots \lambda_{24}$ are transmission wavelength ranges completely opaque to visible light, $n_m=24$, and $$d_{pq} = \frac{p - [((p + 2 \cdot q - 1)\mathrm{mod}24) + 1]}{q}.$$

Figure 8:
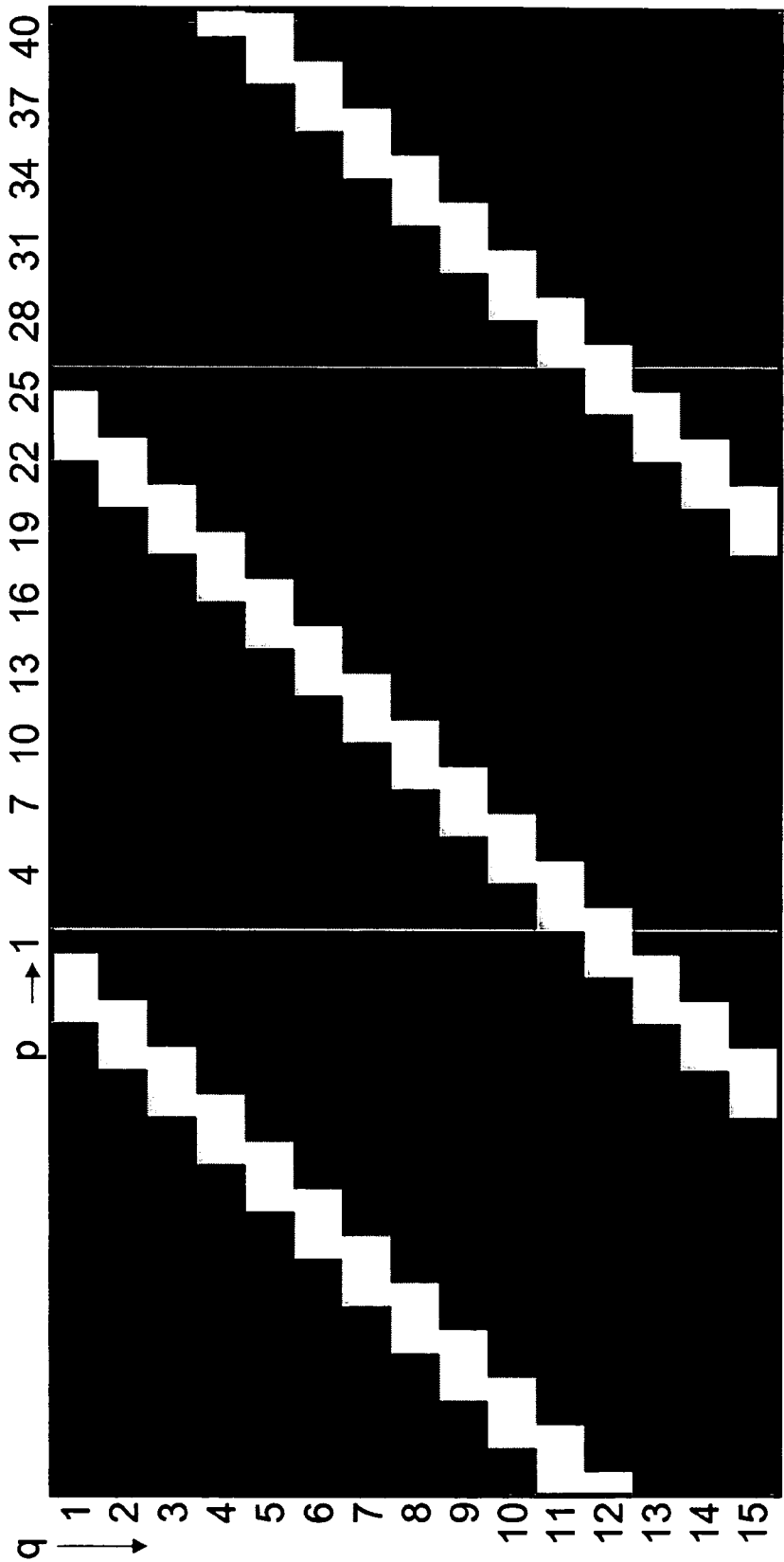
FIG. 8 shows an example of a possible specified filter array structure.

Accordingly, three horizontally adjacent filter elements 3 together are about as large as one image element. A filter array 2 thus defined is shown in FIG. 8 (not to scale). It can be used to advantage with the image combination structure shown in FIG. 7 for producing a spatial impression.

For the description of the image combination rule or the structure of the combined image, the combined image to be specified in step e) is produced according to the following rule:

Partitioning the views $A_k$ (k=1 . . . n) each into an equal grid of rows j and columns i,
Combining the n views $A_k$ in rows and columns to produce a single combined image with image elements $\alpha_{ij}$, the assignment of bits of partial information from the views $A_k$ (k=1 . . . n) to image elements $\alpha_{ij}$ of the positions i,j being defined by the equation $$k = i - c_{ij} \cdot j - n \cdot IntegerPart\left[\frac{i - c_{ij} \cdot j - 1}{n}\right], \text{ in which}$$

i is the index of an image element $\alpha_{ij}$ in a row of the grid,
j is the index of an image element $\alpha_{ij}$ in a column of the grid,
k is the consecutive number of the image $A_k$ (k=1 . . . n), from which the partial information originates that is to be rendered on a particular image element $\alpha_{ij}$,
$c_{ij}$ is a selectable coefficient matrix for combining or mixing on the grid the different bits of partial information originating from the images $A_k$ (k=1 . . . n), and
IntegerPart is a function for generating the largest integer that does not exceed the argument put in square brackets.

As far as the grid (i,j) corresponds to the grid of the color subpixels R,G,B of an LCD screen, and as far as the coefficient matrix $$c_{ij} = \frac{i - \left[\left(IntegerPart\left(i + j \cdot \frac{2}{3}\right)\mathrm{mod}8\right) + 1\right]}{j}$$

is selected for n=8, there results the image combination structure cited repeatedly before, a segment of which is shown in FIG. 7.

The determination of each of the secondary images referred to in step f) of the invention may also be performed as follows:

Area scanning of the planar component lying nearest to the respective monocular position of observation according to the specified arrangement geometry, i.e. either of a filter array 2 or the image generator 1, and, concurrently with the area scanning, production of a sufficiently resolved secondary image, which is an essentially correct replica of the respective visible area shares of the image elements of the combined image, or of the wavelength or gray level filters illuminated by these image elements 3, allowance being made for the specified filter array geometry—especially for wavelength-dependent or wavelength-independent transmittances of the wavelength or gray level filter elements 3—, the specified image generator geometry, and the spatial arrangement geometry.

Here again, the generation of the respective secondary image is performed making allowance especially for the wavelength/the wavelength range assigned to the respective image element, and for all wavelength or gray level filters lying between the observer's eye in the respective position and the respective image element, or for all wavelength or gray level filter elements 3 following the respective image element as seen in the respective viewing direction.

The area scanning is preferably performed by rows and columns; the number of rows and columns should be several thousand, depending on the required quality of the simulation results.

The production of the essentially correct replica of the respective visible area shares of the image elements of the combined image, or of the wavelength or gray level filters 3 illuminated by the image elements of the combined image, may be effected using known ray tracing algorithms, for example. This may also include the specified filter array geometry—especially wavelength-dependent or wavelength-independent transmittances of the wavelength or gray level filters—, the specified image generator geometry, and the spatial arrangement geometry.

With an arrangement geometry according to FIG. 1, a combination image structure according to FIG. 7 and a filter array 2 according to FIG. 8, for example, in the said scanning—here of the filter array 2—, image elements would be either completely visible or partially visible or invisible from the two monocular positions of observation 5 and would accordingly enter the secondary images.

Figure 9:
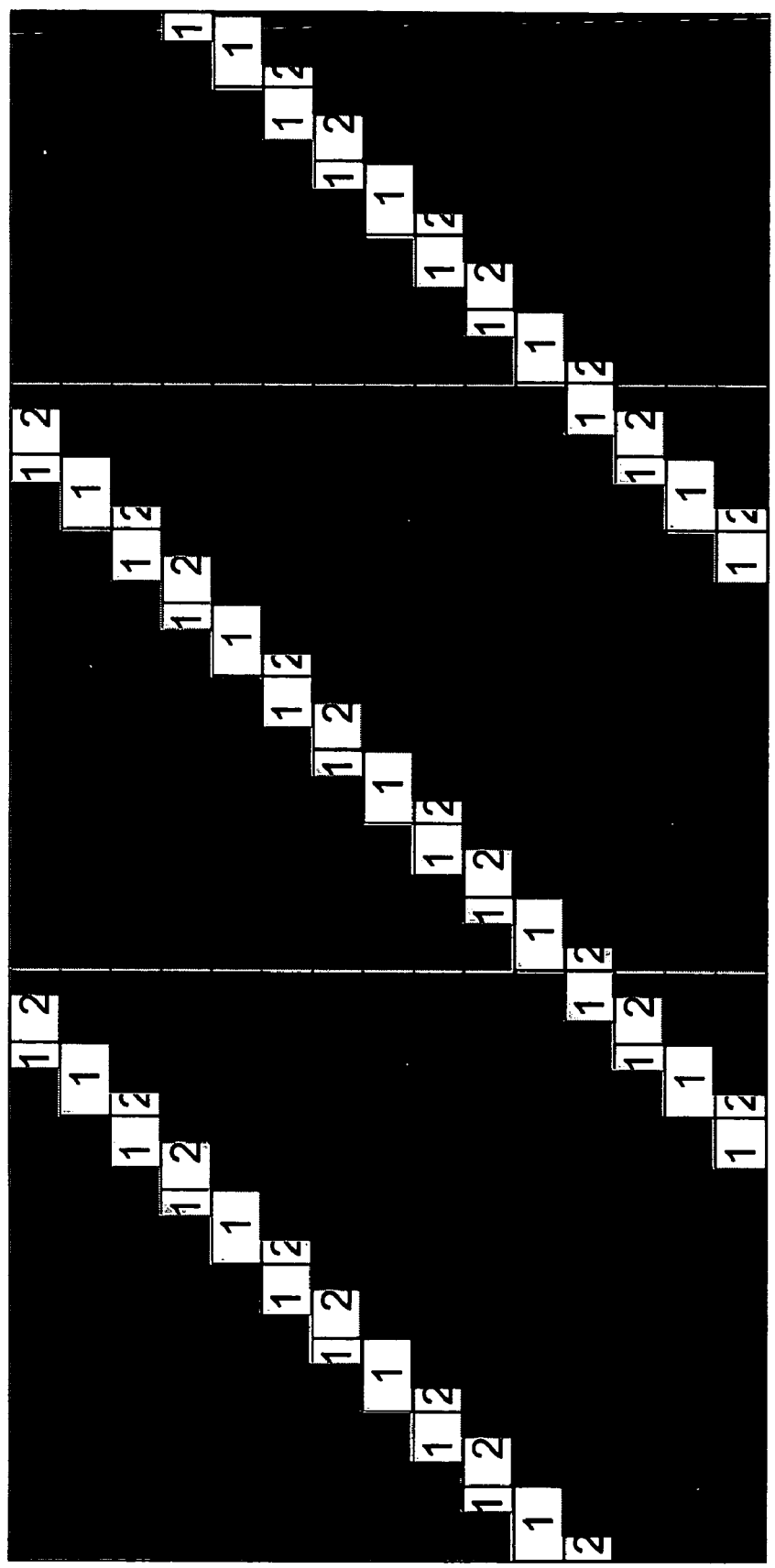
FIG. 9 and FIG. 10 are schematic sketches showing examples of results of the invented simulation method.
Figure 10:
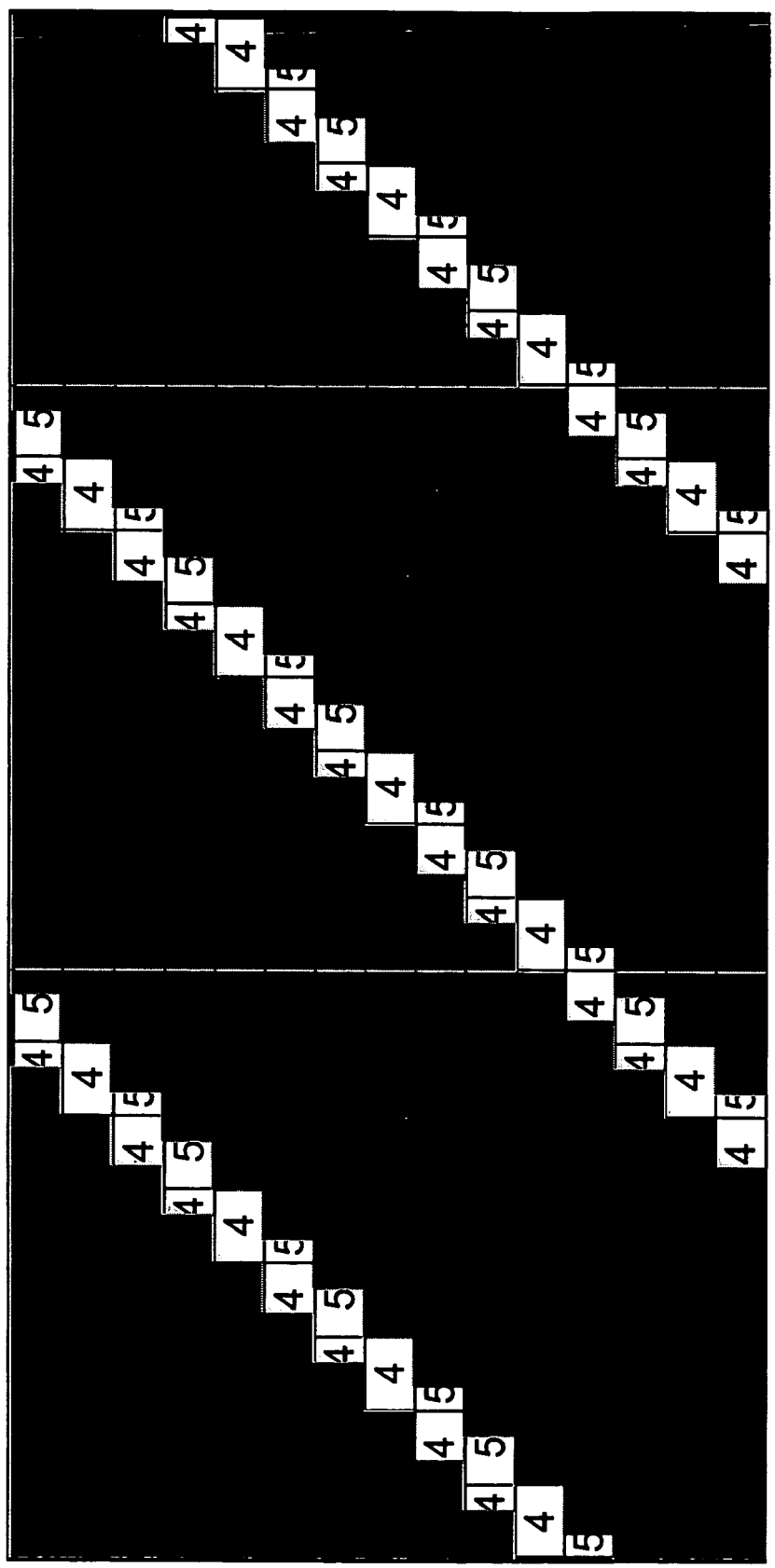

Examples of results of step f) executed by the above rule are shown in FIG. 9 and FIG. 10; it should be noted, however, that the highly resolved secondary images are shown in a special form: Whereas the actual execution of step f) in the way described above actually results in one or two secondary images with certain (modified) image information, FIG. 9 and FIG. 10 show, in a way, the area shares of individual image elements visible from the specified monocular positions of observation 5, the image elements here being marked with regard to the respective view $A_k$ supplying the partial image information. From the monocular position of observation 5 assumed in FIG. 9, for example, only those image elements would be visible that obtain their partial image information from views $A_k$ with k=1 and k=2. According to FIG. 10, the partial image information visible would come from views $A_k$ with k=4 and k=5.

These drawings, by the way, well illustrate the mode of creating the spatial impression as described in DE 100 03 326 C2: Either eye predominantly sees a selection of particular views.

In another detailed embodiment of the method according to the invention, step g) provides for separate display of the secondary images to the left and the right eye, in which the secondary images are presented spatially side by side, spatially nested, or in temporal succession by means of an image generator, for example a cathode ray tube, an LC display, a DMD projector or a plasma display. Particularly peferably, the display of the secondary images is effected by means of an image generator that has the image generator geometry specified in step a), especially with regard to the structure and size of the image elements.

Figure 13:
Figure 13:
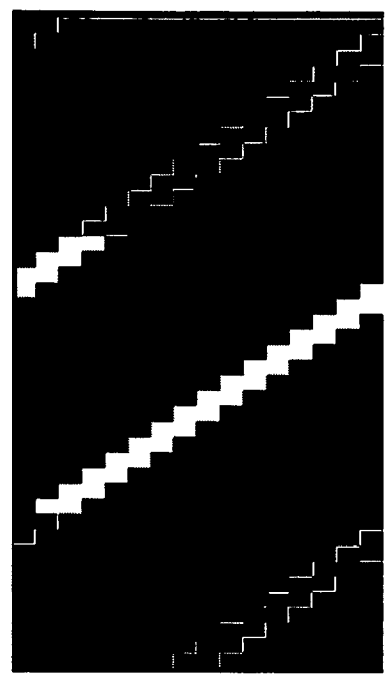
Figure 13:
Figure 13:
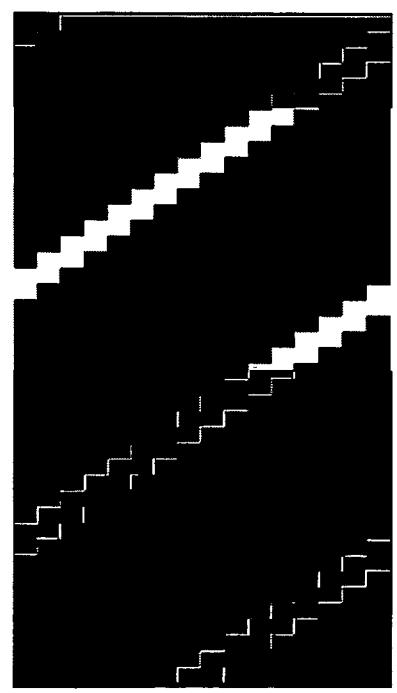

Finally, the upper part of FIG. 13 shows an example of (segments of) a first and a second view of a test scene (in the upper part of the illustration), while the lower part shows a schematic, highly enlarged presentation of an example of a possible simulation result based on these views.

Let a test scene (not described in detail here) result in the two (out of, for example, eight possible) views $A_k$, the drawings illustrating but segments of the respective views. Let a suitable filter array geometry (not shown in detail here) be specified, and let the method according to the invention be executed with suitable monocular positions of observation specified, and let step f) be carried out as the scanning process described above, the simulation result could be that shown in the lower part of FIG. 13. Note that this is a schematic presentation of the secondary image pair that actually should be produced with the highest possible resolution.

With particularly low material expenditure, the invention can be used to advantage for the optimization of 3D arrangements based on filter arrays. It can be employed in industry especially in the scope of 3D display design services.

The favorable cost-to-benefit ratio especially results from the fact that experimental filter arrays for first assessments need not be fabricated physically but can be assessed in advance with a high precision. Moreover, the invention constitutes a particularly fast and economic method for assessing and optimizing the quality of 3D images by, as a rule, computer-assisted simulation.

Further advantages are the exclusion of error influences from imperfect filter geometries or filter functions of physically fabricated filter arrays, the comprehensibility of the mode of operation of simulated arrangements in detail, and direct comparability between conventional primary images (i.e. the views $A_k$) and secondary images. The physiological factors of binocular 3D vision remain effective.

What is claimed is:

1. A method for simulation of spatial visual impressions, comprising the following steps:
    a) Specifying, with computing hardware and programmable memory, an image generator geometry of an image generator, especially with regard to the structure and size of the image elements,
    b) specifying, with computing hardware and programmable memory, a filter array geometry of a filter array, especially with regard to the structure and size of the filter elements,
    c) specifying, with computing hardware and programmable memory, a spatial arrangement geometry in relation to the image generator and the filter array in a three-dimensional coordinate system,
    d) specifying, with computing hardware and programmable memory, a first and a second monocular position of observation in front of the said arrangement geometry in the said three-dimensional coordinate system (X, Y, Z), e) specifying, with computing hardware and programmable memory, a combined image that is suitable for display on the specified image generator geometry and that contains, in a defined assignment to the image elements, image information from different given primary images, which are identical to n different views of a virtual or real scene or of a virtual or real object, where n is an integer, f) determining a first and a second secondary image containing image elements of the specified combined image which are visible to the eye of an observer in the specified first and second monocular positions of observation on the basis of the specified filter array geometry in conjunction with the specified image generator geometry and the spatial arrangement geometry, in which an image element of a secondary image may explicitly just as well represent only part of an image element of the specified combined image, and g) stereoscopically visualizing the first and second secondary images or parts of these secondary images as a left and right stereoscopic image, respectively;

wherein the spatial arrangement geometry specified in step c), relative to the image generator and the filter array in the said three-dimensional coordinate system describes one plane each for the image generator and the filter array, and the spatial positions of top left and bottom right corner points of the filter array or image generator.

* * * * *